United States Patent
Fu et al.

(10) Patent No.: US 11,100,891 B2
(45) Date of Patent: Aug. 24, 2021

(54) ELECTRONIC DEVICE USING UNDER-DISPLAY FINGERPRINT IDENTIFICATION TECHNOLOGY AND WAKING METHOD THEREOF

(71) Applicant: Egis Technology Inc., Taipei (TW)

(72) Inventors: Tong-Long Fu, Taipei (TW);
Chen-Chih Fan, Taipei (TW);
Chun-Ching Tseng, Taipei (TW);
Wei-Jung Wang, Taipei (TW);
Chun-Feng Kao, Taipei (TW);
Yung-Fu Chen, Taipei (TW)

(73) Assignee: Egis Technology Inc., Taipei (TW)

( * ) Notice: Subject to any disclaimer, the term of this patent is extended or adjusted under 35 U.S.C. 154(b) by 0 days.

(21) Appl. No.: 16/653,161

(22) Filed: Oct. 15, 2019

(65) Prior Publication Data

US 2020/0193936 A1 Jun. 18, 2020

Related U.S. Application Data

(60) Provisional application No. 62/780,415, filed on Dec. 17, 2018.

(30) Foreign Application Priority Data

Sep. 3, 2019 (CN) .......................... 201910829354.X (51) Int. Cl.
*G09G 5/10* (2006.01)
*G06F 1/16* (2006.01)
*G06K 9/00* (2006.01)

(52) U.S. Cl.
CPC .............. *G09G 5/10* (2013.01); *G06F 1/1643* (2013.01); *G06K 9/00013* (2013.01); *G09G 2320/062* (2013.01); *G09G 2330/021* (2013.01)

(58) Field of Classification Search
CPC .............. G09G 5/10; G09G 2320/062; G09G 2330/021; G06F 1/1643; G06F 1/329;
(Continued)

(56) References Cited

U.S. PATENT DOCUMENTS

2017/0244827 A1* 8/2017 Kang .................... G06F 1/3231
2019/0266315 A1* 8/2019 Li .......................... G06F 9/4418
2019/0370584 A1* 12/2019 Wang .................... G06F 3/0412

FOREIGN PATENT DOCUMENTS

CN 105844130 8/2016
CN 107231677 10/2017
(Continued)

OTHER PUBLICATIONS

"Office Action of China Counterpart Application", dated Feb. 8, 2021, p. 1-p. 10.
(Continued)

*Primary Examiner* — Sahlu Okebato
(74) *Attorney, Agent, or Firm* — JCIPRNET (57) ABSTRACT

An electronic device using an under-display fingerprint identification technology and a waking method of the electronic device are provided. The electronic device includes a display panel, a central processing unit and a fingerprint sensing module. The electronic device executes an operating system. When the central processing unit and the operating system are in a power-saving mode, the fingerprint sensing module enters a default operation mode and the display panel enters an always-on display mode. Then, the fingerprint sensing module senses a specified region of the display panel to acquire a first image. If the content of the first image contains an image of a finger, the fingerprint sensing module issues an interrupt signal to the central processing unit.
(Continued)

Consequently, the central processing unit is woken up from the power-saving mode and the operating system is woken up.

8 Claims, 6 Drawing Sheets

(58) Field of Classification Search
CPC .. G06F 9/4418; G06K 9/00013; H04M 1/026; H04M 1/0266; H04M 1/72597; H04M 2250/12; H04W 52/0264; H04W 52/027
See application file for complete search history.

(56) References Cited

FOREIGN PATENT DOCUMENTS

| | | | |
|---|---|---|---|
| CN | 107544798 | | 1/2018 |
| CN | 107656665 | | 2/2018 |
| CN | 108090441 A | * | 5/2018 |
| CN | 108108701 | | 6/2018 |
| CN | 108337913 | | 7/2018 |
| CN | 108496156 | | 9/2018 |
| CN | 108990136 | | 12/2018 |

OTHER PUBLICATIONS

"Office Action of China Counterpart Application", dated Jul. 27, 2020, p. 1-p. 10.

* cited by examiner

ELECTRONIC DEVICE USING UNDER-DISPLAY FINGERPRINT IDENTIFICATION TECHNOLOGY AND WAKING METHOD THEREOF

CROSS-REFERENCE TO RELATED APPLICATION

This application claims priority to U.S. Provisional Patent Application No. 62/780,415 filed Dec. 17, 2018 and Chinese Patent Application No. 201910829354.X filed Sep. 3, 2019, the contents of which are incorporated herein by reference.

FIELD OF THE INVENTION

The present invention relates to an electronic device and a waking method of the electronic device, and more particularly to an electronic device using an under-display fingerprint identification technology and having an always-on display function and a waking method of the electronic device.

BACKGROUND OF THE INVENTION

Recently, biometric identification technologies are important subjects of various industries in order to ensure information security. As known, a fingerprint identification technology is one of the widely-used biometric identification technologies.

A fingerprint is a pattern composed of many curvy lines. In the enlarged view, these lines are lumpy because these lines include alternate ridges and valleys. A fingerprint feature indicates the distribution of these lumpy lines. Generally, everyone has the unique fingerprint feature. The uniqueness of the fingerprint feature can be used as a basis of recognizing the identity.

Generally, the memory space for storing the image or data of the fingerprint is limited. Consequently, more mobile electronic devices or laptops are equipped with fingerprint identification modules. According to the fingerprint identification technologies, the structure or image of the fingerprint is acquired firstly. After the structure or image of the fingerprint is calculated, compared and analyzed through algorithms, the identity of the user can be recognized.

For example, the fingerprint identification module is applied to a smart phone. When the smart phone is operated in a power-saving mode (e.g., a suspend mode or a sleep mode) and locked, the user may unlock the smart phone by placing a finger on a touch panel. After the fingerprint of the finger is identified, the smart phone is unlocked and operated in a normal working state. In the power-saving mode, some electronic units of the smart phone should be continuously enabled to wake up the operating system at any time and perform the fingerprint identification. For example, the touch panel of the smart phone is continuously enabled to detect whether any finger is placed thereon. If the fingerprint identification is unable to be implemented successfully, the smart phone cannot be unlocked.

Figure 1:
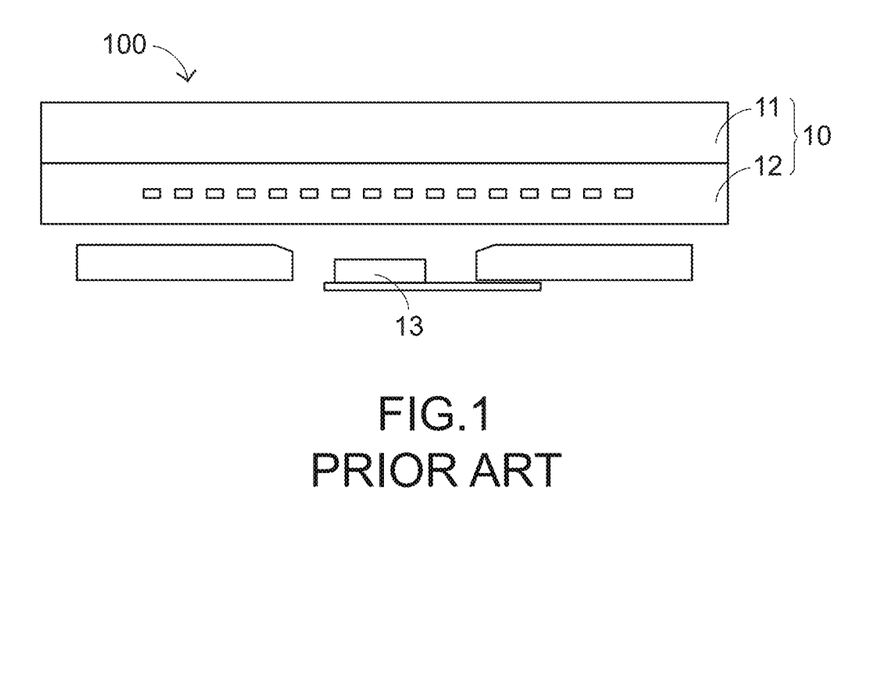
FIG. 1 schematically illustrates the hardware structure of an electronic device using a conventional fingerprint on display (FOD) identification technology or under-display fingerprint identification technology.

FIG. 1 schematically illustrates the hardware structure of an electronic device using a conventional fingerprint on display (FOD) identification technology or an under-display fingerprint identification technology. As shown in FIG. 1, the electronic device 100 includes a touch screen 10 and an optical fingerprint sensor 13. The optical fingerprint sensor 13 is located under the touch screen 10. The touch screen 10 includes a touch panel 11 and a display panel 12.

Figure 2:
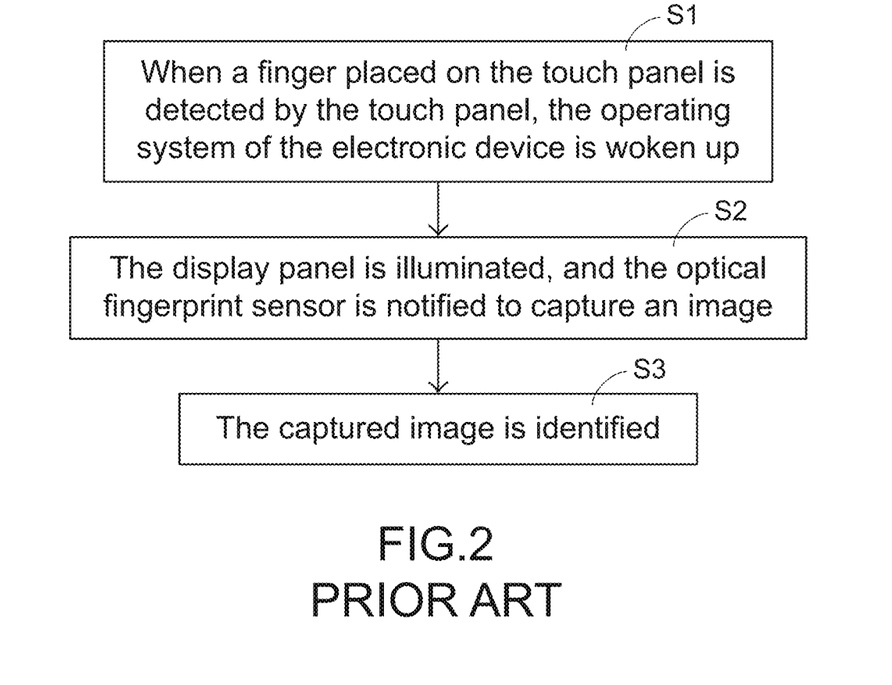
FIG. 2 is a flowchart illustrating a method of waking up an operating system and identifying a fingerprint through the hardware structure as shown in FIG. 1.

FIG. 2 is a flowchart illustrating a method of waking up an operating system and identifying a fingerprint through the hardware structure as shown in FIG. 1. Firstly, the touch panel 11 is enabled to start detection. When a finger placed on the touch panel 11 is detected by the touch panel 11, the operating system of the electronic device 100 is woken up (Step S1). For example, the electronic device 100 is a smart phone, a tablet computer or a laptop. Then, the display panel is illuminated in a high brightness mode (HBM), and the optical fingerprint sensor 13 is notified to capture an image (Step S2). Then, a process of identifying the captured image is performed (Step S3).

However, the process of waking up the operating system through the detection of the finger on the touch panel 11 still has some drawbacks. For example, this design is power-consuming and easily results in misjudgment. For solving these drawbacks, the existing technology uses a motion sensor (e.g., a gyroscope) to detect the motion of the electronic device 100. If the electronic device 100 is moved, the motion sensor is enabled to wake up the operating system. However, the use of the motion sensor to detect the motion of the electronic device 100 still has some drawbacks. For example, if the electronic device 100 is not moved, the motion sensor does not respond and the operating system and the central processing unit are not woken up for identification. If the user intends to unlock the electronic device 100 at this moment, it is necessary to wake up the operating system and the central processing unit through the finger detection of the touch panel 11 and then identify the fingerprint. In other words, if the touch panel 11 is not enabled when the electronic device 100 is not moved, the electronic device 100 cannot be unlocked.

For example, it is required that the average electricity consumption of a smart phone in the power-saving mode should be lower than 2 mA. However, for normally receiving messages or incoming calls, some electronic components (e.g., a 4G wireless transmission module or a WiFi wireless transmission module) of the smart phone in the power-saving mode are still enabled. Since the operation of the touch panel 11 consumes a certain amount of electricity, the use of the motion sensor can assist in waking up the operating system in a power-saving manner. As mentioned above, the motion sensor is not enabled when the smart phone is not moved. In other words, the touch panel 11 is responsible of waking the operating system when the smart phone is not moved. If more electronic components are enabled to wake up the operating system, the electricity consumption may exceed 2 mA. Under this circumstance, the power-saving efficacy is impaired.

Recently, a smart phone with an always-on display function has been introduced into the market. When the smart phone with the always-on display function is in the power-saving mode, at least one pattern or character is shown on a specified region of the display panel 12 to prompt the user about the touch region. When the always-on display function is active, the entire of the display screen are not turned on but some important information (e.g., the date, time, battery status, incoming call or short message status) may be continuously shown on some portions of the display panel. The always-on display technology can be applied to the display panel that uses the organic light-emitting diode (OLED) as the light source. Since all pixels of the OLED display panel can be turned on individually, most black pixels are turned off individually.

When the always-on display function is active, the display panel 12 is not completely turned on. However, for enabling the fingerprint identification function at any time, the touch panel 11 needs to be continuously enabled. Since each time of the finger detection through the touch panel 11 wakes up the operating system once, this design is also power-consuming. In accordance with a variation technology, the display panel 12 is not completely turned on and the touch condition of the touch panel 11 is periodically detected at a specified time interval (e.g., 1 ms). However, since the central processing unit of the electronic device 100 is woken up whenever the touch condition of the touch panel 11 is detected, the central processing unit cannot really enter the power-saving mode (e.g., the suspend mode or the sleep mode). In other words, the power-saving efficacy is still unsatisfied.

SUMMARY OF THE INVENTION

An object of the present invention provides an electronic device using an under-display fingerprint identification technology and a waking method of the electronic device. In the power-saving mode, if the judging result indicates that the content of the first image contains a finger image, the central processing unit is enabled again and the operating system is woken up. Consequently, the power-saving efficacy is enhanced.

In accordance with an aspect of the present invention, a waking method for an electronic device using an under-display fingerprint identification technology is provided. The electronic device includes a display panel, a central processing unit and a fingerprint sensing module. The electronic device executes an operating system. The waking method includes the following steps. When the central processing unit and the operating system are in a power-saving mode, the fingerprint sensing module enters a default operation mode and the display panel enters an always-on display mode. Then, a predetermined pattern is shown on a specified region of the display panel. Then, the fingerprint sensing module senses the specified region to acquire a first image, and generates a judging result according to the first image. If the judging result indicates that a content of the first image contains an image of a finger, the fingerprint sensing module issues an interrupt signal to the central processing unit. In response to the interrupt signal, the central processing unit is woken up from the power-saving mode and the operating system is woken up.

In accordance with another aspect of the present invention, an electronic device using an under-display fingerprint identification technology is provided. The electronic device executes an operating system. The electronic device includes a central processing unit, a display panel and a fingerprint sensing module. The display panel includes a specified region. When the central processing unit and the operating system are in a power-saving mode, the display panel enters an always-on display mode, and a predetermined pattern is shown on the specified region. The fingerprint sensing module is located under the display panel. When the central processing unit and the operating system are in the power-saving mode, the fingerprint sensing module enters a default operation mode. When the fingerprint sensing module enters the default operation mode, the fingerprint sensing module senses the specified region to acquire a first image, and generates a judging result according to the first image. If the judging result indicates that a content of the first image contains an image of a finger, the fingerprint sensing module issues an interrupt signal to the central processing unit. In response to the interrupt signal, the central processing unit is woken up from the power-saving mode and the operating system is woken up.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 3:
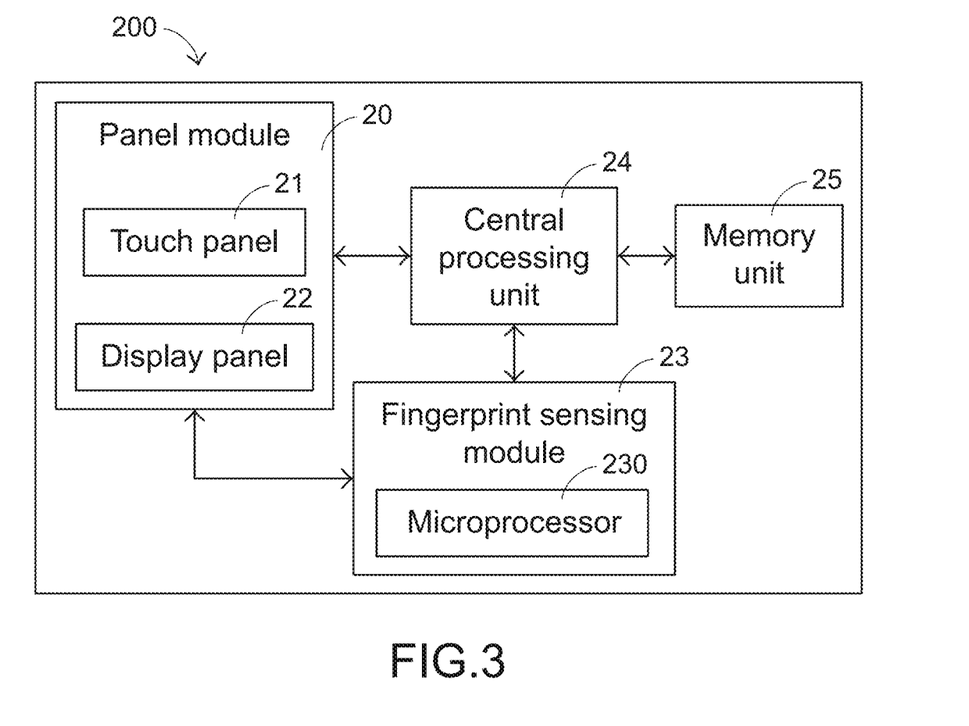
FIG. 3 is a schematic functional block diagram illustrating an electronic device using an under-display fingerprint identification technology according to an embodiment of the present invention.

Please refer to FIG. 3. FIG. 3 is a schematic functional block diagram illustrating an electronic device using an under-display fingerprint identification technology according to an embodiment of the present invention. As shown in FIG. 3, the electronic device 200 includes a panel module 20, a central processing unit 24, a fingerprint sensing module 23 and a memory unit 25. The panel module 20 includes a display panel 22 and a touch panel 21. In an embodiment, the fingerprint sensing module 23 includes a microprocessor 230. The architecture of the electronic device 200 is similar to that of FIG. 1, and is not redundantly described herein. The fingerprint sensing module 23 is located under the panel module 20. The touch panel 21 is located over the display panel 22. The electronic device 200 can execute an operating system. The operating system is loaded into the memory unit 25. An example of the electronic device 200 includes but is not limited to a smart phone or a tablet computer. Preferably but not exclusively, the light source of the display panel 22 is an organic light-emitting diode (OLED).

Figure 5:
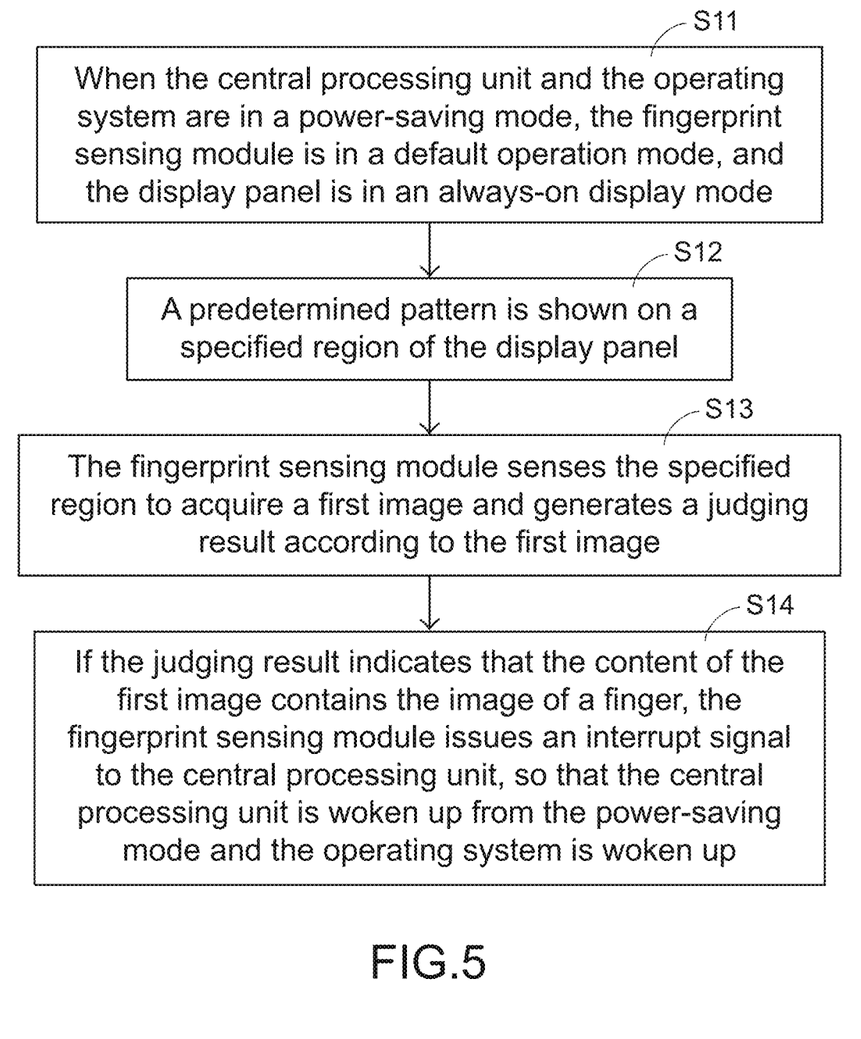
FIG. 5 is a flowchart illustrating a fingerprint sensing process according to a first embodiment of the present invention.

Please refer to FIG. 5. FIG. 5 is a flowchart illustrating a fingerprint sensing process according to a first embodiment of the present invention. The fingerprint sensing process includes the following steps S11, S12, S13 and S14.

In the step S11, the central processing unit 24 and the operating system are in a power-saving mode. Meanwhile, the fingerprint sensing module 23 is in a default operation mode, and the display panel 22 is in an always-on display mode.

As mentioned above, the conventional technology wakes up the operating system through the touch panel. In accordance with the present invention, the fingerprint sensing module 23 is responsible of waking up the operating system when the central processing unit 24 is in the power-saving mode. Particularly, when the fingerprint sensing module 23 is in the default operation mode, a portion of the circuitry structure of the fingerprint sensing module 23 is in a standby state and the other portion of the circuitry structure of the fingerprint sensing module 23 is in the normal working state. It is noted that numerous modifications and alterations may be made while retaining the teachings of the invention. For example, in another embodiment, the entire of the circuitry structure of the fingerprint sensing module is in the normal working state when the fingerprint sensing module is in the default operation mode.

For effectively achieving the power-saving purpose and waking purpose, the fingerprint sensing module 23 in the default operation mode performs the light-sensing operation, the light-receiving operation and the detecting operation at the average electricity consumption of several microamperes (µA). In an embodiment, the fingerprint sensing module 23 in the default operation mode is operated at the current of 1~500 µA.

As mentioned above, the average electricity consumption of a smart phone in the power-saving mode should be lower than 2 mA. The average electricity consumption of the fingerprint sensing module 23 in the default operation mode complies with this required condition. Consequently, in the power-saving mode, the fingerprint sensing module 23 and the other enabled components share the electricity of 2 mA.

Figure 4:
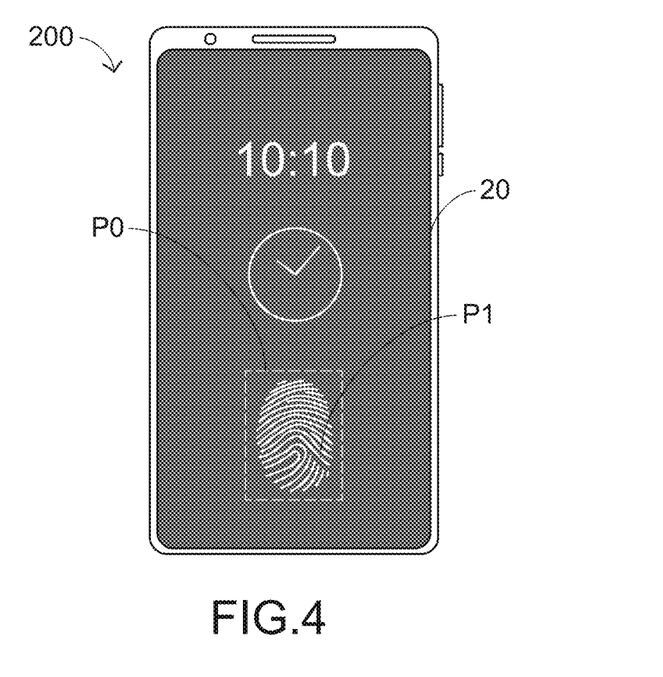
FIG. 4 schematically illustrates the appearance of the electronic device according to the embodiment of the present invention when the display panel is in an always-on display mode.

When the display panel 22 is in the always-on display mode, the appearance of the electronic device 200 is shown in FIG. 4.

In the step S12, a predetermined pattern P1 (see FIG. 4) is shown on a specified region P0 (see FIG. 4) of the display panel 22. In the always-on display mode, the predetermined pattern P1 is shown on the display panel 22 in an always-on display manner. That is, only the pixels of a smaller portion of the display panel 22 are turned on, but the pixels of a greater portion of the display panel 22 are turned off. That is, the predetermined pattern P1 is illuminated. Particularly, the display panel 22 in the always-on display mode is illuminated at a weaker brightness value. For example, the brightness level of the display panel 22 in the always-on display mode is lower than a first brightness threshold value. Consequently, even if the display panel 22 has been operated in the always-on display mode for a long term, the electricity consumption is low. In an embodiment, the display panel 22 in the always-on display mode is illuminated continuously. For further saving the electricity, the display panel 22 in the always-on display mode is illuminated in an intermittent manner. In case that the display panel 22 is illuminated continuously, the brightness level of the display panel 22 may be at a weaker value. In case that the display panel 22 is illuminated in the intermittent manner, the time interval between every two illuminations may be extended to reduce the power consumption.

In an embodiment as shown in FIG. 4, the predetermined pattern P1 is a fingerprint pattern to prompt the user about the touch region. It is noted that the example of the predetermined pattern P1 is not restricted. For example, the predetermined pattern P1 may be a character pattern or a mixed pattern of a picture and a character. Especially, the specified region P0 for showing the predetermined pattern P1 should be aligned with the underlying fingerprint sensing module 23. That is, the pixels of the display panel 22 corresponding to the fingerprint sensing module 23 are turned on. Consequently, when the user's finger is placed on the display panel 22 according to the prompt of the predetermined pattern P1, the fingerprint of the user can be sensed accurately.

In an embodiment, the content of the predetermined pattern P1, the position of the predetermined pattern P1 and other important information are stored in a microprocessor or a memory unit of the display panel 22, and can be read and shown when the display panel 22 is in the always-on display mode.

In the step S13, the fingerprint sensing module 23 senses the specified region P0 to acquire a first image and generates a judging result according to the first image. For illustration, one first image is acquired. It is noted that numerous modifications and alterations may be made while retaining the teachings of the invention. For example, in another embodiment, the fingerprint sensing module 23 senses the specified region P0 to acquire a plurality of first images within a unit time period. Alternatively, the fingerprint sensing module 23 senses the specified region P0 to periodically acquire one first image at a specified time interval.

As mentioned above, only the pixels of a smaller portion of the display panel 22 are turned on, and the brightness level of the display panel 22 is low. Meanwhile, the image quality of the first image is low. However, the microprocessor 230 of the fingerprint sensing module 23 is capable of judging whether the content of the first image is related to the image of a finger. As known, the processing capability of the microprocessor 230 is lower than the central processing unit 24. However, the microprocessor 230 is able to process the rough data corresponding to the low image quality through the logical analysis. As mentioned above, the fingerprint is a pattern composed of many curvy lines, and these lines include alternate ridges and valleys. By analyzing the changes of the ridges and the valleys of these lines, the microprocessor 230 can judge whether the first image is the fingerprint image.

When the fingerprint sensing module 23 acquires the first image, a frame ready signal is generated. In response to the frame ready signal, the microprocessor 230 judges whether the first image is a fingerprint image.

After the step S13, the step S14 is performed. If the judging result indicates that the content of the first image contains the image of a finger, the fingerprint sensing module 23 issues an interrupt signal to the central processing unit 24. In response to the interrupt signal, the central processing unit 24 is woken up from the power-saving mode and then the operating system is woken up. In accordance with a feature of the present invention, the central processing unit 24 (i.e., hardware) is woken up firstly, and then the operating system (i.e., software) is woken up by the central processing unit 24. That is, the operating system loaded in the memory unit 25 is woken up by the central processing unit 24.

From the above descriptions, the method of the present invention implements the fingerprint identification in two stages. In the first stage, the microprocessor 230 judges whether the object placed over the specified region P0 of the display panel 22 is a finger. If the microprocessor 230 confirms that the object is a finger, the operating system is woken up. After the operating system is woken up, the second stage of the method performs the fingerprint identification through more precise image analysis.

Figure 6:
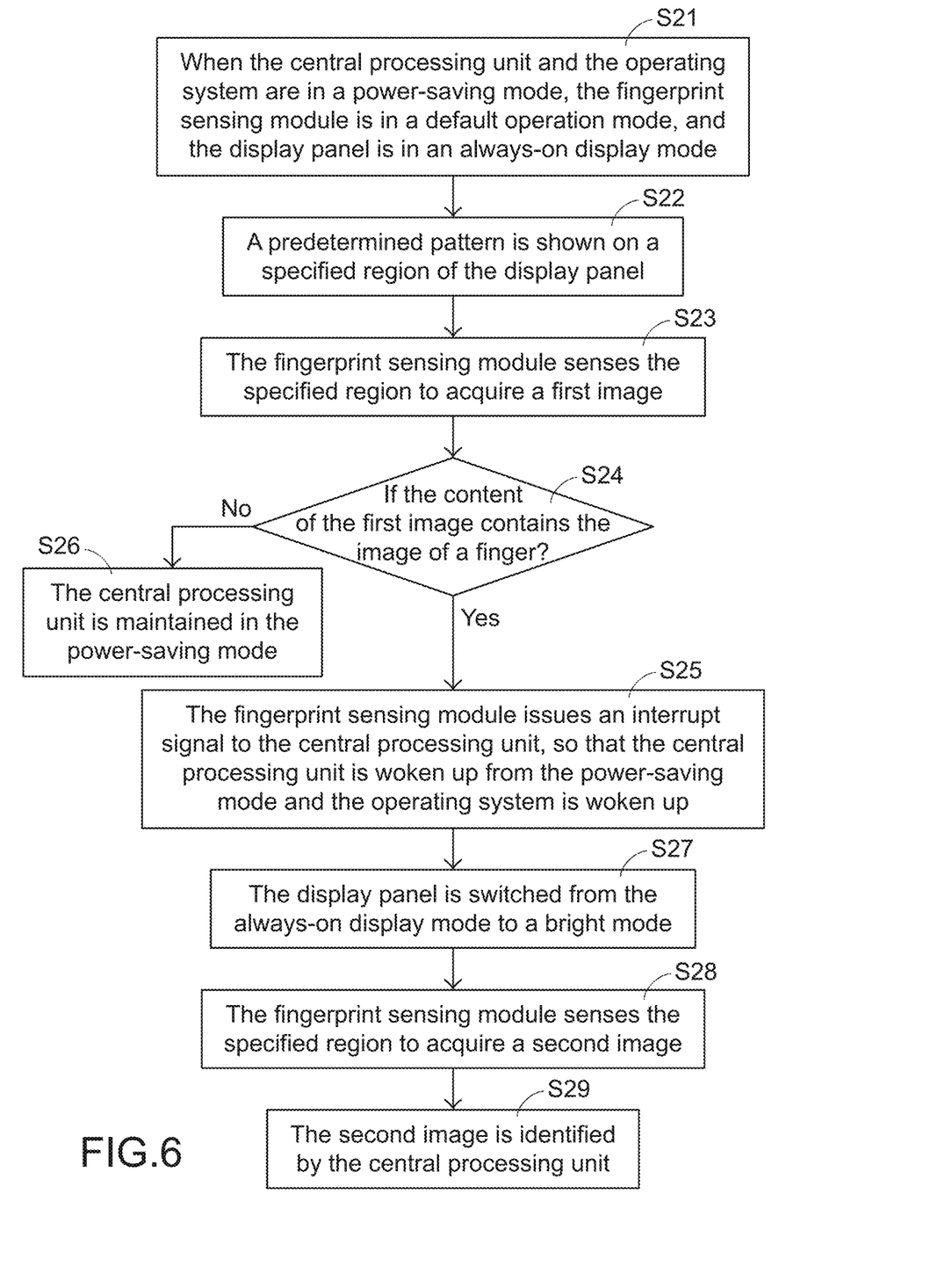
FIG. 6 is a flowchart illustrating a fingerprint sensing process according to a second embodiment of the present invention.

Please refer to FIG. 6. FIG. 6 is a flowchart illustrating a fingerprint sensing process according to a second embodiment of the present invention. Component parts and elements corresponding to those of the first embodiment as shown in FIGS. 3 and 4 are designated by identical numeral references, and detailed descriptions thereof are omitted.

In a step S21, the central processing unit 24 and the operating system are in a power-saving mode. Meanwhile, the fingerprint sensing module 23 is in a default operation mode, and the display panel 22 is in an always-on display mode.

In a step S22, a predetermined pattern P1 (see FIG. 4) is shown on a specified region P0 (see FIG. 4) of the display panel 22.

In a step S23, the fingerprint sensing module 23 senses the specified region P0 to acquire a first image.

In a step S24, the fingerprint sensing module 23 judges whether the content of the first image contains the image of a finger.

If the judging condition of the step S24 is satisfied, a step S25 is performed. That is, the fingerprint sensing module 23 issues an interrupt signal to the central processing unit 24. In response to the interrupt signal, the central processing unit 24 is woken up from the power-saving mode and then the operating system is woken up.

Whereas, if the judging condition of the step S24 is not satisfied, a step S26 is performed. Under this circumstance, the central processing unit 24 is maintained in the power-saving mode.

After the step S25, the operating system is woken up. Then, a step S27 is performed. That is, the display panel 22 is switched from the always-on display mode to a bright mode. Then, the fingerprint sensing module 23 senses the specified region P0 to acquire a second image (Step S28). In comparison with the flowchart of FIG. 5, the fingerprint sensing process of this embodiment further increases the brightness level of the light source of the display panel 22 after the operating system is woken. Consequently, the second image is sharper than the first image. Moreover, since the central processing unit 24 is restored to the normal working state, the central processing unit 24 can start to control the peripheral components. For example, the central processing unit 24 can change the operation mode of the display panel 22.

In the bright mode, the display panel 22 is illuminated at the stronger brightness value. For example, the brightness level of the display panel 22 in the bright mode is high than a second brightness threshold value. Since the finger is irradiated by the light beam with the high brightness level, the sharper fingerprint image can be acquired. Preferably, the bright mode is a high brightness mode (HBM) for turning on some or all pixels of the display panel 22. Of course, the second brightness threshold value is higher than the first brightness threshold value.

Then, in a step S29, the second image is transmitted to the central processing unit 24 so as to be identified by the central processing unit 24. Since the second image is acquired when the light beam with the high brightness level is used, the image quality of the second image is better than the image quality of the first image. In other words, the accuracy of the fingerprint identification is largely enhanced. In an embodiment, the microprocessor 230 is responsible for analyzing the rough image (e.g., the first image) to implement the simple biometric identification (e.g., finger identification), and the central processing unit 24 is responsible for analyzing the second image to implement the complicated identification (e.g., fingerprint identification).

Figure 7:
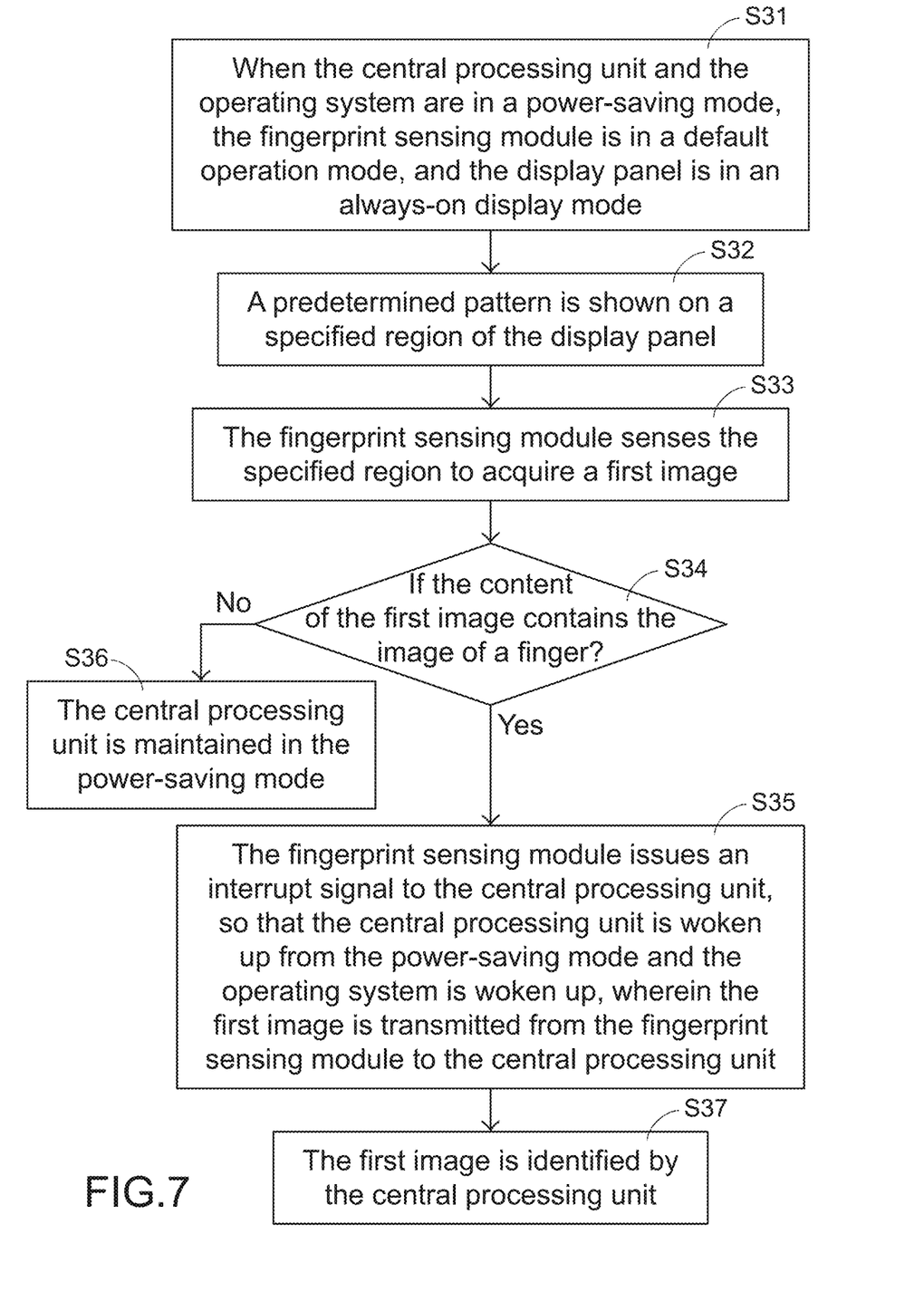
FIG. 7 is a flowchart illustrating a fingerprint sensing process according to a third embodiment of the present invention.

Please refer to FIG. 7. FIG. 7 is a flowchart illustrating a fingerprint sensing process according to a third embodiment of the present invention.

In a step S31, the central processing unit 24 and the operating system are in a power-saving mode. Meanwhile, the fingerprint sensing module 23 is in a default operation mode, and the display panel 22 is in an always-on display mode.

In a step S32, a predetermined pattern P1 (see FIG. 4) is shown on a specified region P0 (see FIG. 4) of the display panel 22.

In a step S33, the fingerprint sensing module 23 senses the specified region P0 to acquire a first image.

In a step S34, the fingerprint sensing module 23 judges whether the content of the first image contains the image of a finger.

If the judging condition of the step S34 is satisfied, a step S35 is performed. That is, the fingerprint sensing module 23 issues an interrupt signal to the central processing unit 24. In response to the interrupt signal, the central processing unit 24 is woken up from the power-saving mode and then the operating system is woken up. Moreover, the first image is transmitted from the fingerprint sensing module 23 to the central processing unit 24.

Whereas, if the judging condition of the step S34 is not satisfied, a step S36 is performed. Under this circumstance, the central processing unit 24 is maintained in the power-saving mode.

After the step S35, the operating system is woken up. Then, a step S37 is performed. Meanwhile, the first image is identified by the central processing unit 24. In this embodiment, the fingerprint sensing module 23 should have high-level sensing sensitivity. Even if the intensity of the ambient light is weak, the fingerprint sensing module 23 is still able to acquire the image with high image quality. When the predetermined pattern P1 is shown on the display panel 22, the low brightness level of the predetermined pattern P1 is sufficient for the fingerprint sensing module 23 to acquire the first image with satisfactory sharpness. After the fingerprint sensing module 23 judges that the content of the first image contains the image of a finger, it is not necessary to switch the operation mode of the display panel 22 to the high brightness mode (HBM) and the fingerprint sensing module 23 does not need to sense the fingerprint again. Consequently, in the step S37, the first image can be identified by the central processing unit 24 directly.

Figure 8:
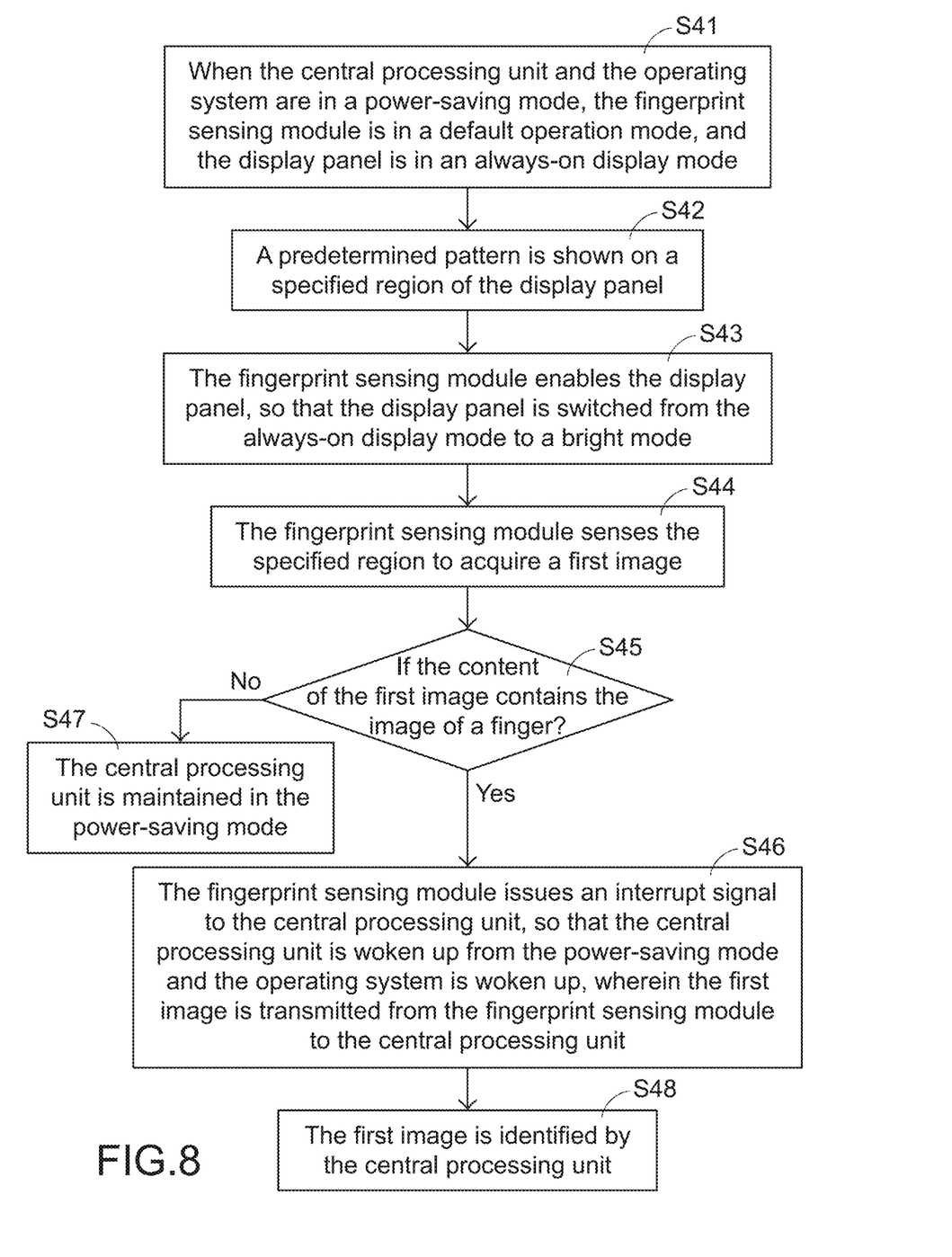
FIG. 8 is a flowchart illustrating a fingerprint sensing process according to a fourth embodiment of the present invention.

Please refer to FIG. 8. FIG. 8 is a flowchart illustrating a fingerprint sensing process according to a fourth embodiment of the present invention.

In a step S41, the central processing unit 24 and the operating system are in a power-saving mode. Meanwhile, the fingerprint sensing module 23 is in a default operation mode, and the display panel 22 is in an always-on display mode In a step S42, a predetermined pattern P1 (see FIG. 4) is shown on a specified region P0 (see FIG. 4) of the display panel 22.

In a step S43, the fingerprint sensing module 23 enables the display panel 22. Consequently, the display panel 22 is switched from the always-on display mode to a bright mode.

In comparison with the flowcharts of FIGS. 6 and 7, the step S43 of the fingerprint sensing process of this embodiment illuminates the display panel 22 at the stronger brightness value. Preferably, the bright mode is a high brightness mode (HBM). Moreover, the display panel 22 is enabled by the fingerprint sensing module 23 rather than the central processing unit 24. For achieving this enabling purpose, it is necessary to install a hardware interface between the fingerprint sensing module 23 and the display panel 22. In other words, a circuitry structure is designed to electrically couple the fingerprint sensing module 23 to the display panel 22. The fingerprint sensing module 23 can perform the light-sensing operation, the light-receiving operation and the detecting operation. In an embodiment, the fingerprint sensing module 23 enables the display panel 22 at the time when the fingerprint sensing module 23 senses a change of an ambient light.

In a step S44, the fingerprint sensing module 23 senses the specified region P0 to acquire a first image.

In a step S45, the fingerprint sensing module 23 judges whether the content of the first image contains the image of a finger.

If the judging condition of the step S45 is satisfied, a step S46 is performed. That is, the fingerprint sensing module 23 issues an interrupt signal to the central processing unit 24. In response to the interrupt signal, the central processing unit 24 is woken up from the power-saving mode and then the operating system is woken up. Moreover, the first image is transmitted from the fingerprint sensing module 23 to the central processing unit 24.

Whereas, if the judging condition of the step S45 is not satisfied, a step S47 is performed. Under this circumstance, the central processing unit 24 is maintained in the power-saving mode.

After the step S46, the operating system is woken up. Then, a step S48 is performed. Meanwhile, the first image is identified by the central processing unit 24.

In this embodiment, the fingerprint sensing module 23 enables the display panel 22 to emit the light beam with the high brightness level and then captures the image. Since the finger is irradiated by the light beam with the high brightness level, the sharper fingerprint image can be captured. In other words, the captured first image is the precise image with high quality. After the fingerprint sensing module 23 judges that the content of the first image contains the image of a finger, the fingerprint sensing module 23 does not need to sense the fingerprint again. Consequently, in the step S48, the first image can be identified by the central processing unit 24 directly.

In this embodiment, the display panel 22 is operated in the bright mode that consumes energy before the step of judging whether the content of the first image contains the image of a finger. However, the process of illuminating the display panel 22 is not controlled by the central processing unit 24. That is, before the fingerprint sensing module 23 confirms that the content of the first image contains the image of a finger, the central processing unit 24 is still in the power-saving mode and not woken up. Consequently, the power-saving efficacy is satisfied.

For further increasing the power-saving efficacy, this embodiment may be modified. For example, in the step S47, the display panel 22 is switched from the bright mode to the always-on display mode.

For increasing the success rate of judgment, the detection technology of the touch panel 21 is added to the fingerprint sensing process of the above embodiments. Moreover, the detecting result of the touch panel 21 can assist in judging whether any finger is placed on the touch panel 21. For example, when the central processing unit 24 and the operating system are in a power-saving mode, the touch panel 21 is also in the default operation mode. In the default operation mode, the touch panel 21 performs the fingerprint detection to generate a detecting result and transmits the detecting result to the fingerprint sensing module 23. When the microprocessor 230 of the fingerprint sensing module 23 judges whether the content of the first image contains the image of a finger, the microprocessor 230 may refer to the detecting result from the touch panel 21.

Generally, the fingerprint sensing module 23 is an optical type component. If a paper containing a fingerprint picture is placed on the panel module 20 corresponding to the position of the predetermined pattern P1 to cover the fingerprint sensing module 23, the microprocessor 230 of the fingerprint sensing module 23 judges that the content of the first image contains the image of a finger. Since the paper containing the fingerprint picture is not a real finger and the fingerprint sensing module 23 is unable to perform the capacitive detection, the problem of causing misjudgment occurs. Generally, the touch panel 21 is a capacitive component. Since the paper containing the fingerprint picture is placed on the panel module 20 and the charge of the touch panel 21 is not subjected to a change, the touch panel 21 has no response to the paper containing the fingerprint picture.

As mentioned above, the detection technology of the touch panel 21 can provide the reference or assistance in judging the user's finger in order to avoid the misjudgment. It is noted that the applications of the touch panel 21 and the fingerprint sensing module 23 may be altered according to the practical requirements. For example, if the conflict between the detecting result of the touch panel 21 and the judging result of the fingerprint sensing module 23 occurs, the detecting result of the touch panel 21 or the acquired image of the fingerprint sensing module 23 is selectively set to have the application priority. Moreover, after the detecting result of the touch panel 21 is generated, the central processing unit 24 and the operating system are not woken up. Whereas, the detecting result of the touch panel 21 is transmitted to the fingerprint sensing module 23. Consequently, the power-saving purpose is also achievable.

From the above descriptions, the present invention provides an electronic device using an under-display fingerprint identification technology and a waking method. In the power-saving mode, if the judging result indicates that the content of the first image contains a finger image, the central processing unit is enabled again and the operating system is woken up. Consequently, the power-saving efficacy is enhanced. In accordance with the technology of the present invention, the fingerprint sensing module plays the main role of waking up the operating system. Moreover, the detecting result of the touch panel can assist in judging whether any finger is placed on the touch panel. Consequently, the problem of causing misjudgment will be avoided. In other words, the technology of the present invention can overcome the drawbacks of the conventional technologies while achieving the objects of the present invention.

The waking method of the present invention is executed by a firmware that is installed in the electronic device. Alternatively, the waking method is executed by an application program that is stored in a flash memory (not shown) of the electronic device. When the operated in a power-saving mode (e.g., a suspend mode or a sleep mode) and the screen of the electronic device is locked (i.e., in a black screen state), the waking method is executed to identify the fingerprint. After the user's identity is successfully recognized through the fingerprint identification, the electronic device is unlocked.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A waking method for an electronic device using an under-display fingerprint identification technology, the electronic device comprising a display panel, a central processing unit and a fingerprint sensing module, the electronic device executing an operating system, the waking method comprising steps of:
when the central processing unit and the operating system are in a power-saving mode, operating the fingerprint sensing module in a default operation mode and operating the display panel in an always-on display mode, wherein when the display panel is in the always-on display mode, a brightness level of the display panel is lower than a first brightness threshold value;
during the central processing unit and the operating system operating in the power-saving mode, showing a predetermined pattern on a specified region of the display panel by the display panel operating in the always-on display mode, wherein pixels of a region outside the specified region of the display panel are turned off;
during the central processing unit and the operating system operating in the power-saving mode, the fingerprint sensing module sensing the specified region to acquire a first image, and analyzing the first image to determine whether there is an image of a finger in the first image to generate a judging result; and
if the judging result indicates that a content of the first image contains the image of the finger, the fingerprint sensing module issuing an interrupt signal to the central processing unit, wherein in response to the interrupt signal, the central processing unit is woken up from the power-saving mode and the operating system is woken up, when the central processing unit has finished waking up, the central processing unit operates a fingerprint identification according to a second image acquired after the first image,
wherein after the operating system is woken up, the waking method further comprises steps of:
switching an operation mode of the display panel from the always-on display mode to a bright mode, wherein when the display panel is in the bright mode, a brightness level of the display panel is higher than a second brightness threshold value, and the second brightness threshold value is higher than the first brightness threshold value;
the fingerprint sensing module sensing the specified region to acquire the second image;
transmitting the second image from the fingerprint sensing module to the central processing unit; and
identifying the second image by the central processing unit, wherein the second image is a fingerprint image and is a brighter fingerprint image than the first image.

2. The waking method as claimed in claim 1, wherein the fingerprint sensing module comprises a microprocessor, and the microprocessor generates the judging result according to the first image.

3. The waking method as claimed in claim 1, wherein if the judging result indicates that the content of the first image does not contain the image of the finger, the central processing unit is maintained in the power-saving mode.

4. The waking method as claimed in claim 1, wherein the electronic device further comprises a touch panel, and the waking method further comprising steps of:
when the central processing unit and the operating system are in the power-saving mode, allowing the touch panel to enter the default operation mode; and
the touch panel performing a fingerprint detection to generate a detecting result, and issuing the detecting result to the fingerprint sensing module.

5. An electronic device using an under-display fingerprint identification technology, the electronic device executing an operating system, the electronic device comprising:
a central processing unit;
a display panel with a specified region, wherein when the central processing unit and the operating system are in a power-saving mode, the display panel is operated in an always-on display mode, and a predetermined pattern is shown on the specified region, wherein pixels of a region outside the specified region of the display panel are turned off, wherein when the display panel is in the always-on display mode, a brightness level of the display panel is lower than a first brightness threshold value; and
a fingerprint sensing module located under the display panel, wherein when the central processing unit and the operating system are in the power-saving mode, the fingerprint sensing module is operated in a default operation mode, wherein when the fingerprint sensing module is operated in the default operation mode, the fingerprint sensing module senses the specified region to acquire a first image, and analyzes the first image to determine whether there is an image of a finger in the first image to generate a judging result,
wherein if the judging result indicates that a content of the first image contains the image of the finger, the fingerprint sensing module issues an interrupt signal to the central processing unit, wherein in response to the interrupt signal, the central processing unit is woken up from the power-saving mode and the operating system is woken up, when the central processing unit has finished waking up, the central processing unit operates a fingerprint identification according to a second image acquired after the first image,
wherein after the operating system is woken up, an operation mode of the display panel is switched from the always-on display mode to a bright mode, the fingerprint sensing module senses the specified region to acquire the second image, the second image is transmitted from the fingerprint sensing module to the central processing unit, and the second image is identified by the central processing unit, wherein when the display panel is in the bright mode, a brightness level of the display panel is higher than a second brightness threshold value, and the second brightness threshold value is higher than the first brightness threshold value, wherein the second image is a fingerprint image and is a brighter fingerprint image than the first image.

6. The electronic device as claimed in claim 5, wherein the fingerprint sensing module comprises a microprocessor, and the microprocessor generates the judging result according to the first image.

7. The electronic device as claimed in claim 5, wherein if the judging result indicates that the content of the first image does not contain the image of the finger, the central processing unit is maintained in the power-saving mode.

8. The electronic device as claimed in claim 5, wherein the electronic device further comprises a touch panel, wherein when the central processing unit and the operating system are in the power-saving mode, the touch panel enters the default operation mode, and the touch panel performs a fingerprint detection to generate a detecting result and issues the detecting result to the fingerprint sensing module.

* * * * *